June 5, 1923.
H. J. MURRAY ET AL
1,457,789
FLEXIBLE POWER TRANSMISSION
Filed Oct. 3, 1918
2 Sheets-Sheet 1
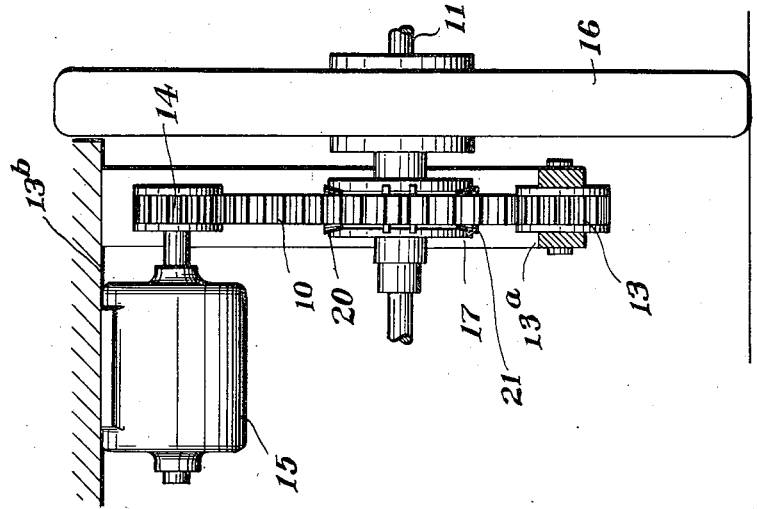
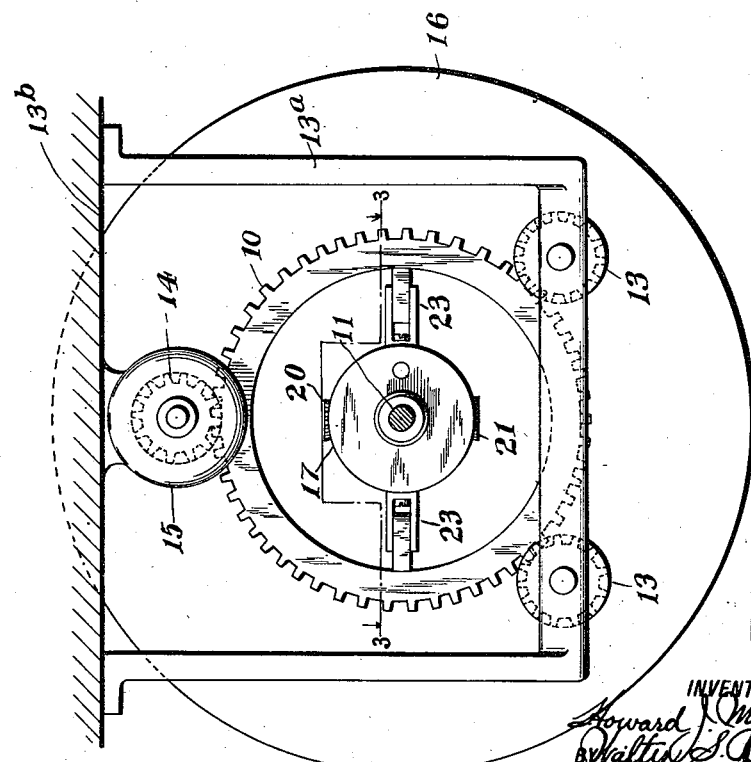

June 5, 1923.

H. J. MURRAY ET AL 1,457,789

FLEXIBLE POWER TRANSMISSION

Filed Oct. 3, 1918

INVENTOR
Howard J. Murray
Walter J. Rugg
Messimer and Austin
ATTORNEYS

Patented June 5, 1923.

1,457,789

UNITED STATES PATENT OFFICE.

HOWARD J. MURRAY, OF BROOKLYN, NEW YORK, AND WALTER S. RUGG, OF PITTSBURGH, PENNSYLVANIA.

FLEXIBLE POWER TRANSMISSION.

Application filed October 3, 1918. Serial No. 256,648.

*To all whom it may concern:*

Be it known that we, HOWARD J. MURRAY, a citizen of the United States, and a resident of Brooklyn, county of Kings, and State of New York, and WALTER S. RUGG, a citizen of the United States, and a resident of Pittsburgh, county of Allegheny, and State of Pennsylvania, have invented certain new and useful Improvements in Flexible Power Transmission, of which the following is a specification.

The invention relates in general to a mechanical coupling for transmitting rotary motion from a driving to a driven member where one of the members is mounted for movement relative to the other.

One physical form of the invention has been developed in connection with a mechanism for coupling a motor mounted on a spring supported car underframe with the live axle in automobile construction and which has also been developed in connection with the wheel carrying axles of electric engines of the flange wheel type. In vehicle power transmission systems it is desirable to hold the motor, and as much as possible of the other parts of the power plant, relatively stationary and to provide a positive and economic form of drive between the motor and floating axle while permitting the maximum degree of necessary freedom of movement to the axle. However, it is understood that the invention herein described is of general application and with obvious mechanical variations may be utilized in any situation where a positive drive is desired between two members mounted to have some degree of rotational freedom relative to each other.

The primary object of the invention is to provide a positive form of driving connection between relatively movable power members which connection will be free of springs or other parts subject to deterioration and at the same time possess not only minimum transmission losses but will possess the maximum ease of movement between the driven and driving member.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings:—

Figure 1 is a view in side elevation of a vehicle wheel and axle together with a driving power plant and showing a preferred embodiment of my invention installed in operative engagement therewith;

Figure 2 is a view in end elevation of the wheel and parts shown in Figure 1;

Figure 5 is a view similar to Figure 3 but showing the axis of the driven member shifted longitudinally from its normal position;

Figure 3:
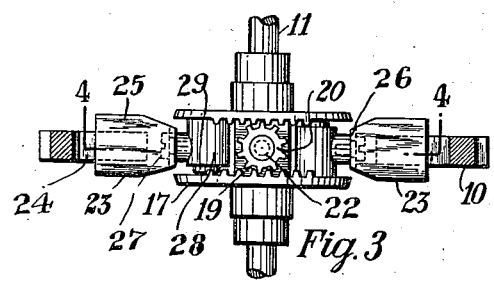
Figure 3 is a horizontal sectional view taken on the line 3—3 of Figure 1.

In the following description and in the claims, parts will be identified by specific names for convenience of expression but they are intended to be as generic in their application to similar parts as the art will permit.

In the drawings there is shown a gear wheel 10 and a shaft 11, either one of which may be selectively called the driving member and the other of which may be the driven member, depending upon the direction of application of the source of power to the mechanism. These members may be supported in any usual way depending upon the character of machine with which the device is to be utilized and for the purpose of completing the disclosure in the drawings, it will be assumed that the gear wheel 10 is the driving member supported on bearings 13 mounted in the frame 13ª, which is secured to the body of the vehicle indicated diagrammatically at 13ᵇ. A pinion 14 supported from the vehicle meshes with the teeth of the gear wheel and is operatively connected with a motor 15 for driving the gear wheel.

Figure 6:
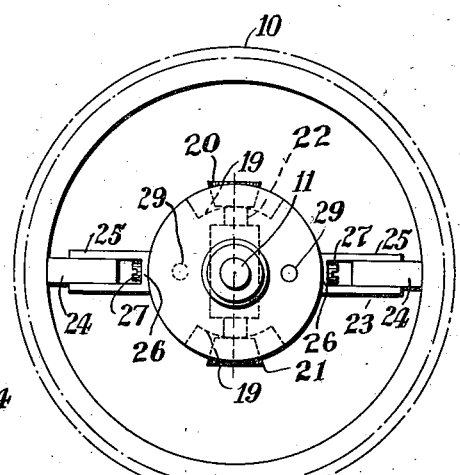
Figure 6 is a view in side elevation and largely diagrammatic of the driving and driven members when in the position shown in Figure 5 but obviously this view can also be regarded as showing the parts in normal position as in Figure 1.
Figure 7:
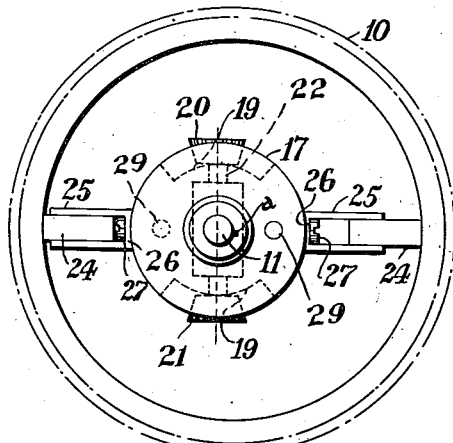
Figure 7 is a view similar to Figure 6 showing the axis of the driven member offset in the plane of the driving member from its normal position and in the direction of the connecting spokes.
Figure 8:
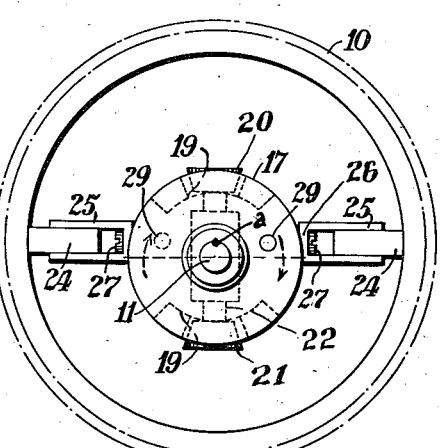
Figure 8 is a similar view showing the axis offset at right angles to the direction offset in Figure 7.

By this construction there is provided one power element of the transmission, the axis of which is regarded as fixed and indicated by a heavy dot —a— in Figures 7 and 8. The shaft 11 may be considered as an axle supported by a ground engaging wheel 16. As is usual in vehicles, this axle is mounted so that its axis positioned in the dash lines in Figures 6, 7 and 8 is free to move vertically, horizontally, longitudinally and in a direction which may be a combination of two or three of such directions.

Figure 4:
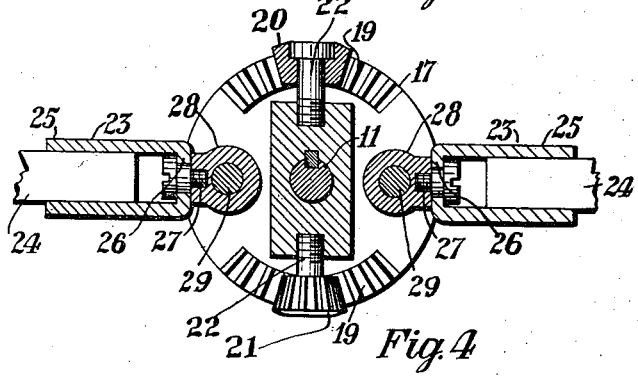
Figure 4 is an enlarged detail view of the differential connection and taken on the line 4—4 of Figure 3.

A differential 17 is mounted upon the shaft and is normally positioned within the plane of the wheel by agencies such as the mounting of the motor on the truck frame and forming no necessary part of this disclosure. The parts are preferably, although not necessarily, associated so that normally the axis of rotation of the shaft will coincide with the axis of rotation of the wheel, as shown in Figure 4. The differential includes a pair of disk shaped drivers mounted loosely on the shaft 11 and each provided on its inner face with oppositely disposed parts of mutilated racks 19. One of the racks on one of the drivers is constantly connected with the corresponding rack on the opposite driver through an idler gear 20 and the other racks are correspondingly connected through an idler gear 21. The two idlers, one for each set of racks, are freely mounted for rotary movement about their axes upon a pair of diametrically extending shafts 22 fixed to and extending radially in opposite directions from the shaft 11.

A pair of driving spokes 23 extend from the differential outwardly in opposite directions, radially of the wheel to which they are attached. Each spoke extends at right angles to the axis of the shaft 22 and is normally in alignment coinciding with a diameter of the gear wheel 10.

The spokes are each formed of two parts, a long rectangular block 24 fixed rigidly to the inner periphery of the gear wheel and a U-shaped yoke 25 straddling the inner end of the block and bearing on the upper and lower sides thereof. The crotch 26 of one of the yokes is pivotally connected by means of a radially extending screw 27 with a head 28 in turn pivotally connected with one of the drivers through a transversely extending pivoting pin 29. The other yoke is similarly connected to the other driver so that one yoke is connected to one of the drivers and the other yoke is connected to the other driver and both yokes have a freedom of movement in two directions, one parallel to the axis of the shaft 11 and the other at right angles to this axis.

In operation and with either the wheel or shaft rotating and for specific discussion assuming that the wheel is rotating, power will be transmitted to the shaft in all positions of the same, three of which positions are shown in the drawings, but it is to be understood that the shaft has three degrees of rotary freedom which may be a combination of any of the three displacements illustrated, in other words, the axes can shift in three relative directions at right angles to each other.

By means of a device of this character, power is transmitted positively from one to the other, without any loss of energy in heating up springs and in fact the only friction in this transmission is generated during the shifting of the axes of the members relative to each other. When the axes do not shift there is no friction.

When these axes are in relatively fixed position and displaced from their normal position, the power is transmitted one to the other with no other movement except the slight shifting of the drivers relative to each other to compensate for the differences in alignment of the two members. Where the axes are but slightly shifted the relative movement between the drivers and the idler of the differential will practically be unnoted and only become perceptible when there is a material shifting of one axis relative to the other.

Having thus described our invention, we claim:—

1. In a power transmission, the combination of a driving and a driven member, one of said members constituting a wheel, and the other member constituting a shaft normally extending transversely of the plane of the wheel adjacent the axis of rotation thereof and having three degrees of rotational freedom relative to the plane of the wheel and a flexible driving connection including telescoping driving members between the wheel and shaft, said connection fixedly coupling the wheel and shaft in all relative driving positions of the same, whereby the wheel and shaft will both have the same angular velocity for all fractions of each rotation while permitting telescopic movement of said driving members during relative displacements of the driving and driven members.

2. In a power transmission, the combination of a driving and a driven member, one of said members constituting a wheel and the other member constituting a shaft normally extending transversely of the plane of the wheel, adjacent the axis of rotation thereof and having three degrees of rotational freedom relative to the plane of the wheel, and power transmitting means extending radially of the wheel and positively connecting the shaft and wheel for transmitting rotary movement from one of the members to the other and for holding the same against relative rotary movement while permitting relative movement in all other directions.

3. In a power transmission, the combination of a driving and a driven member, one of said members constituting a wheel and the other member constituting a shaft normally extending transversely of the plane of the wheel adjacent the axis of rotation thereof and having three degrees of rotational freedom relative to the plane of the wheel, a differential having a pair of drivers loose on the shaft and an intermedate member fixed to the shaft, and telescopic driving spokes pivotally connectng the wheel with each of the differential drivers.

4. In a power transmission, the combination of a driving and a driven member, one of said members constituting a wheel and the other member constituting a shaft normally extending transversely of the plane of the wheel adjacent the axis of rotation thereof and having three degrees of rotational freedom relative to the plane of the wheel, a differential having a pair of drivers loose on the shaft and an intermediate member fixed to the shaft, and diametrically extending spokes between the wheel and each differential driver for transmitting rotary movement from one to the other of said members.

5. In a power transmission, the combination of a driving and a driven member, one of said members constituting a wheel and the other member constituting a shaft normally extending transversely of the plane of the wheel adjacent the axis of rotation thereof and having three degrees of rotational freedom relative to the plane of the wheel, a differential having a pair of drivers loose on the shaft, an intermediate member fixed to the shaft and diametrically extending spokes between the wheel and each differential driver for transmitting rotary movement from one to the other of said members, said sprockets being fixed diametrically of said wheel and pivotally connected at opposite ends to the wheel and drivers.

6. In a power transmission, the combination of a driving and a driven member, one of said members constituting a wheel and the other member constituting a shaft normally extending transversely of the plane of the wheel adjacent the axis of rotation thereof and having three degrees of rotational freedom relative to the plane of the wheel, a differential having a pair of drivers loose on the shaft, an intermediate member fixed to the shaft and diametrically extending spokes between the wheel and each differential driver for transmitting rotary movement from one to the other of said members, said sprockets being fixed diametrically of said wheel and pivotally connected at opposite ends to the wheel and drivers.

7. In a device of the class described, the combination with a driving and a driven member capable of relative movement in all directions except relative rotary movement about their approximate common axis of rotation, of a partly flexible driving connection between said members including a telescoping wheel spoke with one part thereof pivotally connected to one of the members to permit relative movement between the parts in addition to their telescoping movement, said connection acting to maintain said members rigid relative to each other in their plane of rotary movement and permitting relative movement in all other planes.

8. In a device of the class described, the combination with a driving and a driven member, of a driving connection therebetween said connection including radially extending telescoping members for acting on the members to restrain relative angular movement and pivotal joints between said telescoping members and the driven member for permitting all other relative movement between the members.

9. In a device of the class described, the combination with a driving and a driven member, of a flexible driving connection therebetween constituting a positive mechanical connection between the members and including a pair of telescoping driving connections having relative movement in a plane in addition to their telescoping movement.

This specification signed this 24" day of Sept., 1918.

HOWARD J. MURRAY.
WALTER S. RUGG.